(12) United States Patent
Pappanaickenpalayam Muthuswamy et al.

(10) Patent No.: US 11,734,232 B2
(45) Date of Patent: Aug. 22, 2023

(54) INITIAL BASELINES OF FILE SYSTEMS

(71) Applicant: HEWLETT PACKARD ENTERPRISE DEVELOPMENT LP, Houston, TX (US)

(72) Inventors: Priya Pappanaickenpalayam Muthuswamy, Bangalore (IN); Rajkumar Kannan, Bangalore (IN); Anoop Kumar Raveendran, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 411 days.

(21) Appl. No.: 16/509,470

(22) Filed: Jul. 11, 2019

(65) Prior Publication Data

US 2020/0110729 A1 Apr. 9, 2020

(30) Foreign Application Priority Data

Oct. 3, 2018 (IN) .............................. 201841037396

(51) Int. Cl.
*G06F 16/182* (2019.01)
*G06F 16/11* (2019.01)
*G06F 16/27* (2019.01)

(52) U.S. Cl.
CPC .......... *G06F 16/184* (2019.01); *G06F 16/113* (2019.01); *G06F 16/275* (2019.01)

(58) Field of Classification Search
CPC ..... G06F 16/184; G06F 16/113; G06F 16/275
See application file for complete search history.

(56) References Cited

U.S. PATENT DOCUMENTS

| 7,552,146 | B1 | 6/2009 | Kahn et al. |
| 8,131,782 | B1 | 3/2012 | Srinivasan et al. |
| 9,378,261 | B1 | 6/2016 | Bono et al. |
| 10,089,373 | B1* | 10/2018 | Allen ...................... G06F 16/27 |
| 2006/0059204 | A1* | 3/2006 | Borthakur ............. G06F 16/951 |
| 2008/0222152 | A1 | 9/2008 | Godbole |

(Continued)

FOREIGN PATENT DOCUMENTS

| CN | 102184211 A | 9/2011 |
| CN | 106104514 A | 11/2016 |

(Continued)

OTHER PUBLICATIONS

Dell Inc., "Next Generation Data Protection with ONEFS SNAPSHOTIQ," White Paper, Apr. 2017, pp. 1-24.

(Continued)

*Primary Examiner* — Cam Y T Truong
(74) *Attorney, Agent, or Firm* — Trop, Pruner & Hu, P.C.

(57) ABSTRACT

Example implementations relate to identifying file system objects of a file system for generating an initial baseline of the file system. In an example, an inode table of the file system is retrieved. Modes included in the inode table correspond respectively to file system objects of the file system. Attributes, including an object identifier and a time attribute, are extracted from each of the inodes of the inode table. A compilation of the object identifiers from the extracted attributes are provided to a service that generates the initial baseline of the file system using the compilation.

11 Claims, 5 Drawing Sheets

(56) References Cited

U.S. PATENT DOCUMENTS

| | | | | |
|---|---|---|---|---|
| 2009/0228511 | A1* | 9/2009 | Atkin | G06F 16/116 707/999.102 |
| 2010/0070469 | A1* | 3/2010 | Bomma | G06F 16/10 707/610 |
| 2011/0093471 | A1* | 4/2011 | Brockway | G06F 21/10 707/E17.083 |
| 2012/0095970 | A1 | 4/2012 | Shyam et al. | |
| 2013/0006932 | A1* | 1/2013 | Akulavenkatavara | G06F 16/273 707/626 |
| 2013/0297658 | A1* | 11/2013 | Guarraci | G06F 16/27 707/797 |
| 2014/0074790 | A1* | 3/2014 | Berman | G06F 11/1435 707/649 |
| 2015/0242284 | A1* | 8/2015 | Ignatius | G06F 11/1448 707/752 |
| 2015/0269203 | A1 | 9/2015 | Baldwin et al. | |
| 2015/0339314 | A1* | 11/2015 | Collins | G06F 16/183 707/693 |
| 2016/0292047 | A1 | 10/2016 | Bender et al. | |
| 2017/0149886 | A1 | 5/2017 | Shetty | |
| 2017/0277602 | A1 | 9/2017 | Kumar et al. | |
| 2018/0143997 | A1 | 5/2018 | Ye et al. | |
| 2018/0307705 | A1* | 10/2018 | Bender | G06F 11/1458 |
| 2019/0034507 | A1* | 1/2019 | Duttagupta | G06F 16/1752 |
| 2019/0243728 | A1* | 8/2019 | Zhang | G06F 11/1469 |
| 2021/0110054 | A1* | 4/2021 | Eda | G06F 16/13 |

FOREIGN PATENT DOCUMENTS

| | | |
|---|---|---|
| WO | 2010/050944 A1 | 5/2010 |
| WO | WO-2016130167 A1 | 8/2016 |

OTHER PUBLICATIONS

Emc Corporation, "Best Practices for Data Replication with Emc Isilon Synciq," White Paper, Feb. 2016, pp. 1-39.

Jason Hernandez et al., "Parallel tree traversal in C#," Aug. 17, 2011-Mar. 14, 2013, Stack Overflow, <https://stackoverflow.com/questions/7099703/parallel-tree-traversal-in-c-sharp>.

Weeden et al., "Parallelization: Binary Tree Traversal," Shodor Education Foundation, Inc., Aug. 2012, <http://www.shodor.org/media/content/petascale/materials/UPModules/Binary_Tree_Traversal/Binary_Tree_Traversal_Module_Document.pdf.

* cited by examiner

INITIAL BASELINES OF FILE SYSTEMS

BACKGROUND

A file system may be utilized for organizing data on a storage device. In other words, a file system may be used to control how data is stored and retrieved from a storage device. Data may be stored in the form of a file, and a file system may provide the basic structure for organizing files in a storage device. The file system may keep track of file locations, physical or virtual, on a storage medium.

BRIEF DESCRIPTION OF THE DRAWINGS

Various examples will be described below with reference to the following figures.

Throughout the drawings, identical reference numbers may designate similar, but not necessarily identical, elements.

DETAILED DESCRIPTION

A file system provides the underlying structure that a computing device uses to organize data on a storage medium, such as a physical hard drive, solid-state drive, or the like. The file system may comprise a number of objects, including files and directories. The objects of the file system may be organized in a hierarchical directory tree also referred to as a namespace of the file system. Files can contain the data stored on the storage device, including user data, executable files or programs, or other data. Directories may contain a list of references to files or other directories (i.e., sub-directories). A file system may use data structures called inodes to describe each file or directory. Each inode may be associated with a different file or directory and may store attributes, such as identifiers, creation time, modified time, permissions, etc., for the associated file or directory. A file system may be integral to an operating system of a computing device. File systems may store large amounts of data in the millions or billions of files, and file system namespaces may also be correspondingly deep.

Some data operations for a file system may undergo an initialization or set-up phase where a baseline of the file system is generated. For example, a disaster recovery solution may first replicate (i.e., copy) an entire source file system to a target file system by creating a baseline snapshot and then subsequently replicate only the changes of the source file system to the target file system. Before the initial baseline replication can be performed, all objects contained in the file system need to be identified. Identification of file system objects typically involves a tree walk of the namespace, which may include, for example, starting at the root of the namespace and recursively traversing all directories and subdirectories to read the inode data of all objects and generate a list of object identifiers from the inode data. However, walking the namespace of a file system may be time consuming and computationally intensive, particularly for deep directory structures. Delaying the initial baseline replication due to a lengthy namespace walk could leave the file system without a viable backup for disaster recovery and vulnerable to data disaster.

Thus, it may be useful to provide for more efficient identification of file system objects for creating an initial baseline of the file system. Examples described herein may relate to identifying file system objects using an inode table instead of walking a namespace of the file system. For example, an inode table of a file system may be retrieved, where the inode table includes inodes corresponding respectively to all file system objects of the file system. File attributes may be extracted from each inode in the node table. The file attributes of an inode may include, for example, a unique object identifier and a time attribute, such as a modified time and/or creation time. All of the object identifiers from the inodes may be compiled and provided to a service, such as a disaster recovery service, that can then generate an initial baseline of the file system using the compilation of object identifiers. By virtue of collecting object identifiers from inodes in a flat inode table rather than walking a namespace, the file system may be surveyed in much less time and with less computational effort, which in turn can lead to faster time to enabling a data service, such as disaster recovery or the like. Other data services that may benefit from faster baselining of a file system include archival and data governance services (e.g., which generate a checksum baseline of a file system) or metadata scraping services.

Figure 1:
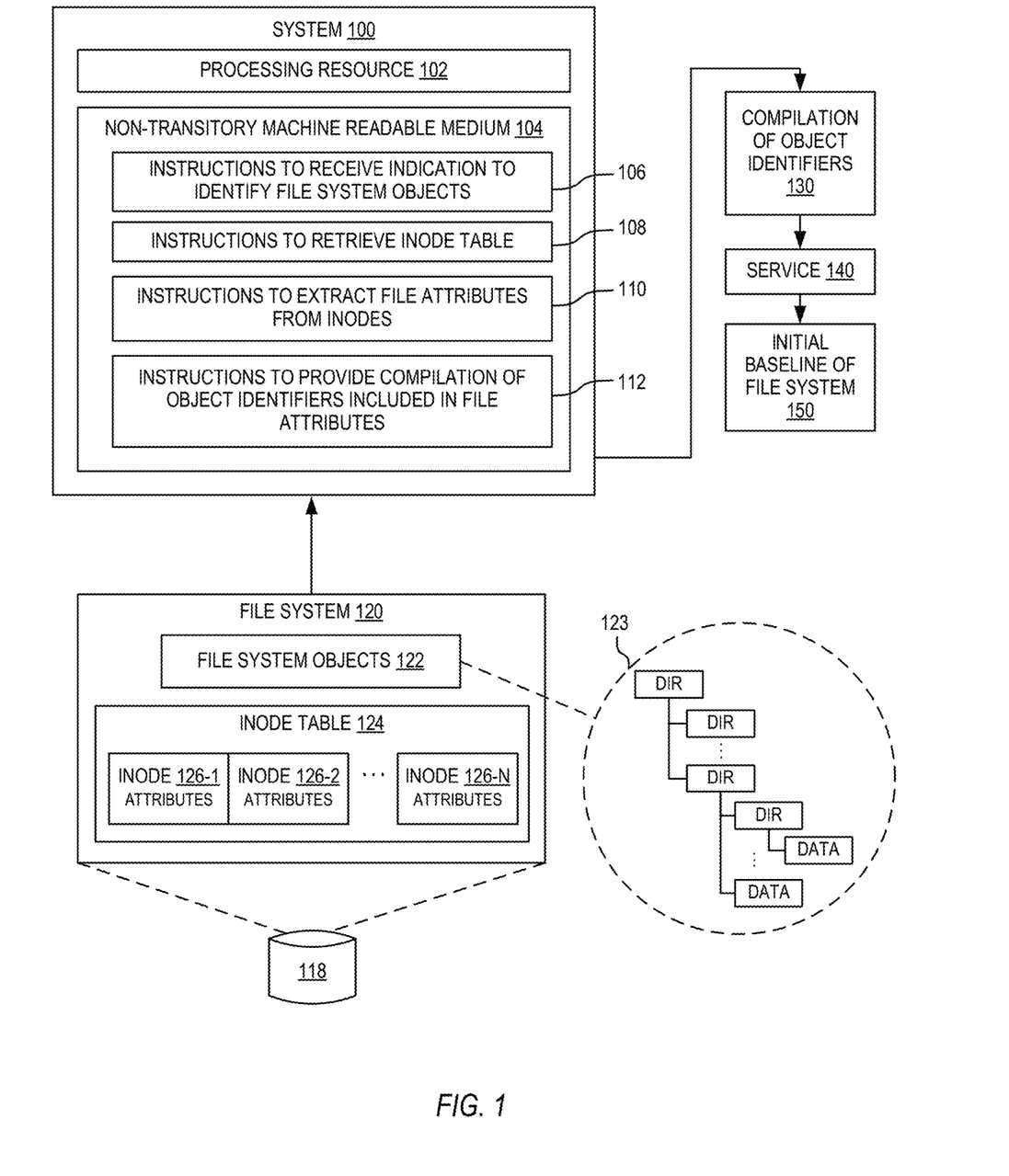
FIG. 1 is a diagram depicting an example system for identifying file system objects for generating an initial baseline of a file system.
Figure 2:
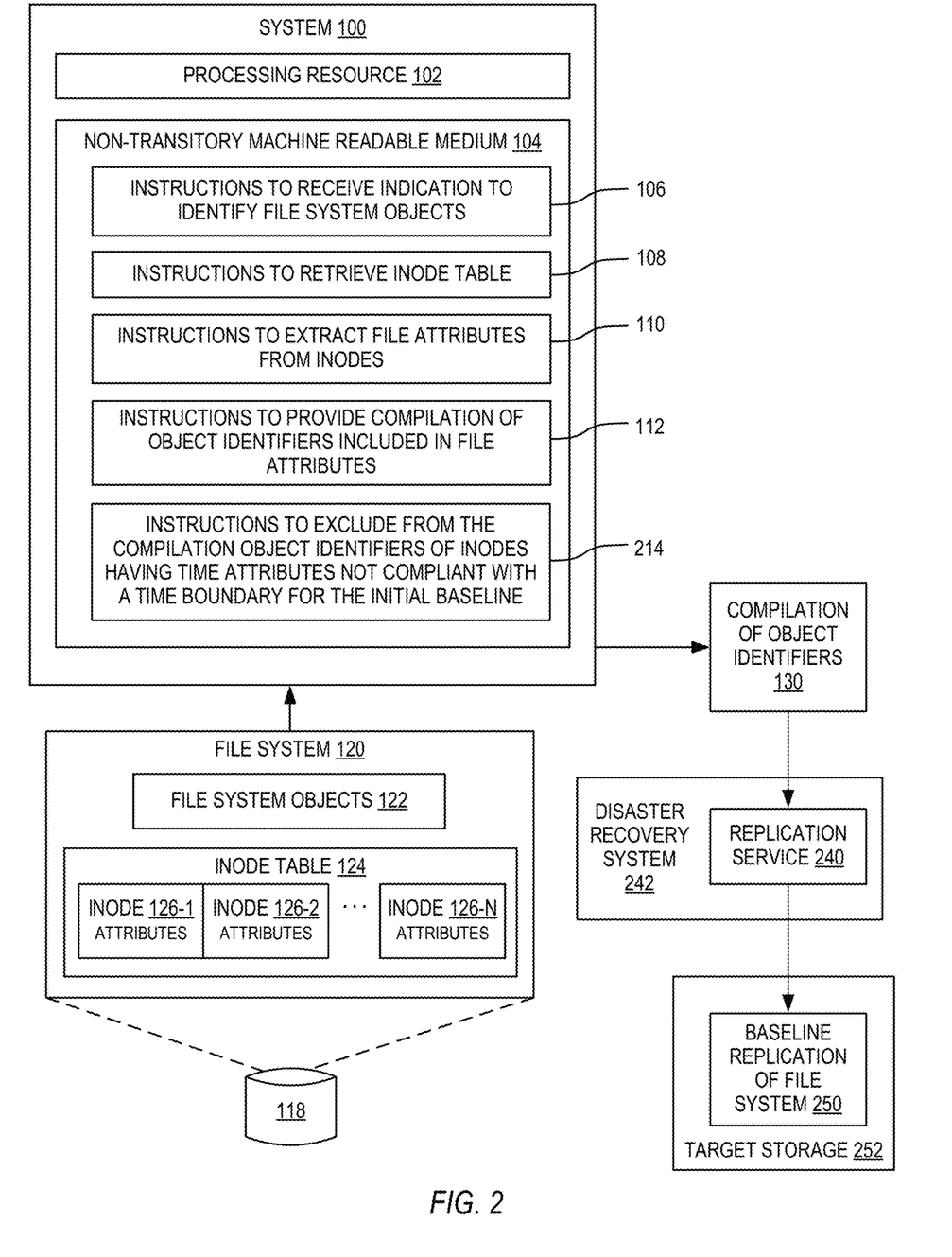
FIG. 2 is a diagram depicting another example system for identifying file system objects for generating an initial baseline of a file system.

Referring now to the figures, FIG. 1 is a block diagram depicting an example system 100. FIG. 2 is a block diagram depicting another implementation of example system 100. Elements bearing the same reference numbers on FIGS. 1 and 2 may be similar and analogous in many respects.

Referring first to FIG. 1, in some examples, the system 100 may form at least part of a computing device (e.g., a server, a hyperconverged system, etc.) or a storage system (e.g., a storage array or storage appliance). The system 100 may include a processing resource 102 and a non-transitory machine readable medium 104 (also referred to herein as medium 104 for brevity). Examples of the processing resource 102 may include hardware such as microprocessors, microcontrollers, central processing units (CPUs), application-specific integrated circuits (ASICs), field programmable gate arrays, etc. Examples of the medium 104 may include random access memory (RAM), read-only memory (ROM), electrically erasable programmable read-only memory (EEPROM), flash memory, and other volatile or non-volatile media.

The medium 104 is "non-transitory" in that the medium 104 does not encompass transitory propagating signals. The medium 104 may be communicatively coupled to the processing resource 102 and may store instructions executable by the processing resource 102, including instructions 106, 108, 110, 112 discussed below. In some examples, a combination of hardware and programming may be used to implement the instructions 106, 108, 110, 112 within a virtual machine running on the system 100. The instructions 106, 108, 110, 112 when executed may serve as an initial synchronization object identification service of the system 100.

A file system 120 may provide the structure to organize data stored on physical storage 118, which may include storage devices such as hard disk drive(s), solid-state drive(s), other types of storage media, or any combination thereof. In some implementations, the file system 120 may span multiple physical storage devices making up the physical storage 118. The physical storage 118 may be included within system 100 (e.g., in a same enclosure as the processing resource 102 and medium 104) or may be external to the system 100 and connected by any wired or wireless communication technology.

As described above, the file system 120 may be comprised of a plurality of file system objects 122, including files and directories (a singular one of the file system objects 122 may be referred to herein generally as a file system object 122). A file is a series of bytes of data and may contain, for example, user data or data related to a program or operating system. A directory includes pointers to other directories or to files. A namespace of the file system 120 refers to how the file system objects 122 are organized hierarchically. For example, a non-limiting example is illustrated as namespace 123. Each file system object 122 may be accompanied by an inode, which is a metadata structure containing attributes of the associated object 122. The objects 122 may be stored to and retrieved from the file system 120 by the system 100 and programs running thereon.

The file system 120 includes an inode table 124, which contains a flat (i.e., non-hierarchical) collection of inodes 126-1 through 126-N corresponding respectively to N-number of file system objects 122 organized by the file system 120. The inodes 126-1 through 126-N (also referred to herein collectively as inodes 126 or individually and generally as an inode 126) may be identical to inodes attached to each of the file system objects 122.

Each inode 126 in the inode table 124 may include attributes for the corresponding file system object 122. An example attribute of an inode may be an object identifier that uniquely identifies a file system object 122 across the entire namespace 123. In other words, an object identifier is not shared by any other inode in the file system 120, regardless of whether the file system 120 spans multiple physical storage devices or spans multiple nodes in a scale-out architecture (e.g., nodes being individual computing and/or storage devices that can be joined together in a cluster). The object identifier may also be referred to as a globally unique identifier (GUID) in some implementations. The object identifier may be constructed from a sufficient number of elements to provide it with uniqueness, including elements such as an inode number (a number that increases for each inode created in the file system), a location number and/or segment number (identifying a location on physical storage that the inode is created on), a generation number (related to the time at which an inode was created, etc.). Other attributes of an inode may include file ownership information, file access permissions, and one or more time attributes, such as a creation time (indicating when the file system object 122 was created) and a modified time (indicating when the file system object 122 was modified) where applicable.

In the example of FIG. 1, the instructions 106, when executed, cause the system 100 to receive an indication to identify file system objects 122 of the file system 120. The indication may be sent by a service 140 that uses identified file system objects 122 to generate an initial baseline 150 of the file system 120. Examples of the service 140 and the initial baseline 150 will be discussed further herein below after first discussing how the file system objects 122 are identified according to example implementations.

Instructions 108, when executed, cause the system 100 to retrieve the inode table 124 of the file system 120. Again, as discussed above, the inode table 124 includes a flat arrangement of inodes 126, each inode 126 corresponding to a respective file system object 122. Instructions 110, when executed, cause the system 100 to extract (i.e., read) attributes from each of the inodes 126 of the inode table 124, the attributes extracted including at least an object identifier. In some implementations, the instructions 110 also extract a time attribute, such as creation time and/or modified time. In some implementations, instructions 110 may cause the system 100 to walk through the flat inode table 124 in order to extract attributes from all inodes 126 included in the inode table 124.

Instructions 112, when executed, cause the system 100 to compile the object identifiers included in the attributes extracted from the inodes 126 and to provide the compilation 130 of object identifiers to the service 140. Subsequently, the service 140 may use the object identifiers in the compilation 130 to access corresponding file system objects 122 identified by the object identifiers and generate an initial baseline 150, instead of using object identifiers found by walking the namespace 123 of the file system 120 to generate the initial baseline 150.

The service 140 may be running on the system 100 (e.g., via instructions stored on medium 104 and executable by the processing resource 102) or may be external to the system 100 (e.g., executing on a computing device in communication with the system 100 or executing remotely or executing as a cloud service). As an example, and as illustrated in FIG. 2, the service 140 may be a replication service 240 of a disaster recovery system 242, and the initial baseline 150 generated by the replication service 240 may be an initial baseline replication 250 of the file system objects 122 on a target storage 252. In other words, the service 140 may use the object identifiers in the compilation 130 to copy file system objects 122 to the target storage 252, thus forming a baseline replication 250 of the file system 120 (also known as a backup). The target storage 252 may be located at a disaster recovery site that is remote from the file system 120 and the physical storage 118 so as to provide geographic diversity. After the baseline replication 250 has been established, the disaster recovery system 242 can replicate modified file system objects based on an audit journal of the file system 120, rather than replicating the entire file system 120.

As another example (and referring again to FIG. 1), the service 140 may be an archival service (e.g., a service or system that provides data retention, governance, and/or auditing functionality). An archival service may use the compilation 130 to generate an initial checksum baseline (as initial baseline 150) of the file system objects 122, e.g., by reading the file system objects 122 based on the object identifiers in the compilation 130 and calculating a checksum for each read object 122. The initial checksum baseline can be used as a basis for subsequent validation scans of the file system 120 and can be updated based on modified objects. In a similar manner, a full namespace virus scan (as service 140) may generate an initial baseline scan (as initial baseline 150) based on the compilation 130, which can be used for subsequent virus scans.

As yet another example, the service 140 may be a indexing service, such as a metadata scraping service, content indexing service, or the like, which reads file system objects 122 and generates object related information. The indexed information may be useful for file system searching, for example. In this example, the service 140 may use the compilation 130 to identify file system objects 122 to include in the index.

The system 100 may identify file system objects 122 by generating a compilation 130 of object identifiers based on attributes extracted from the inode table 124 faster than identifying the same file system objects 122 by walking the namespace 123 of the file system 120. By virtue of identifying file system objects 122 faster, the system 100 can provide the compilation 130 to the service 140 sooner and thus enable the service 140 to initiate its baselining and activate its functionality sooner. In the example where the service 140 is part of a disaster recovery system 242, getting the disaster recovery system 242 initialized and activated faster may offer data protection sooner.

Table 1 below presents example test file systems with different compositions of files and directories and a comparison of the amount of time taken to identify file system objects 122 by either the approach of system 100 ("Inode table approach" column) or a tree walk of the namespace 123 ("Tree walk approach" column). Accordingly, it is apparent that the approach of system 100 significantly improves baselining of the file system 120.

TABLE 1

| File system composition | Inode table approach | Tree walk approach |
|---|---|---|
| 512 directories at a root level; Each directory further includes 512 directories and 10 files; 2,621,440 total file system objects | 5 minutes, 22 seconds | 1 hour, 19 minutes |
| Single directory with 689,300 files; 689,300 total file system objects | 21 seconds | 1 minute, 17 seconds |
| Single directory with 1,733,354 files; 1,733,354 total file system objects | 1 minute, 33 seconds | 3 minutes, 17 seconds |

Referring again to FIG. 2, in some implementations, the system may filter the object identifiers to provide a selective compilation of object identifiers to the service 140 rather than a compilation of all object identifiers. For example, it may be useful for the service 140 to generate an initial baseline 150 that reflects the file system 120 at a particular point in time. In such a case, the indication received by instructions 106 may include a time boundary (also known as a snapshot boundary in some cases). The time boundary may be, for example, a creation time boundary or a modified time boundary. In the example of FIG. 2, the medium 104 includes instructions 214 that, when executed by the processing resource 102, cause the system 100 to exclude from the compilation 130 object identifiers associated with inodes that have time attributes that do not comply with the time boundary (e.g., a creation time or modified time, as the case may be, occurring after the time boundary may be deemed non-compliant).

In an implementation, instructions 214 may work in conjunction with instructions 110 to compare a time attribute to the time boundary after the time attribute is extracted from an inode (by instructions 110) and exclude the corresponding object identifier before it is entered in the compilation 130. In another implementation, instructions 214 may act on the compilation 130 before instructions 112 provides the compilation 130 to the service 140. For example, instructions 214 may cause the system 100 to remove object identifiers associated with inodes having time attributes that do not comply with the time boundary.

Figure 3:
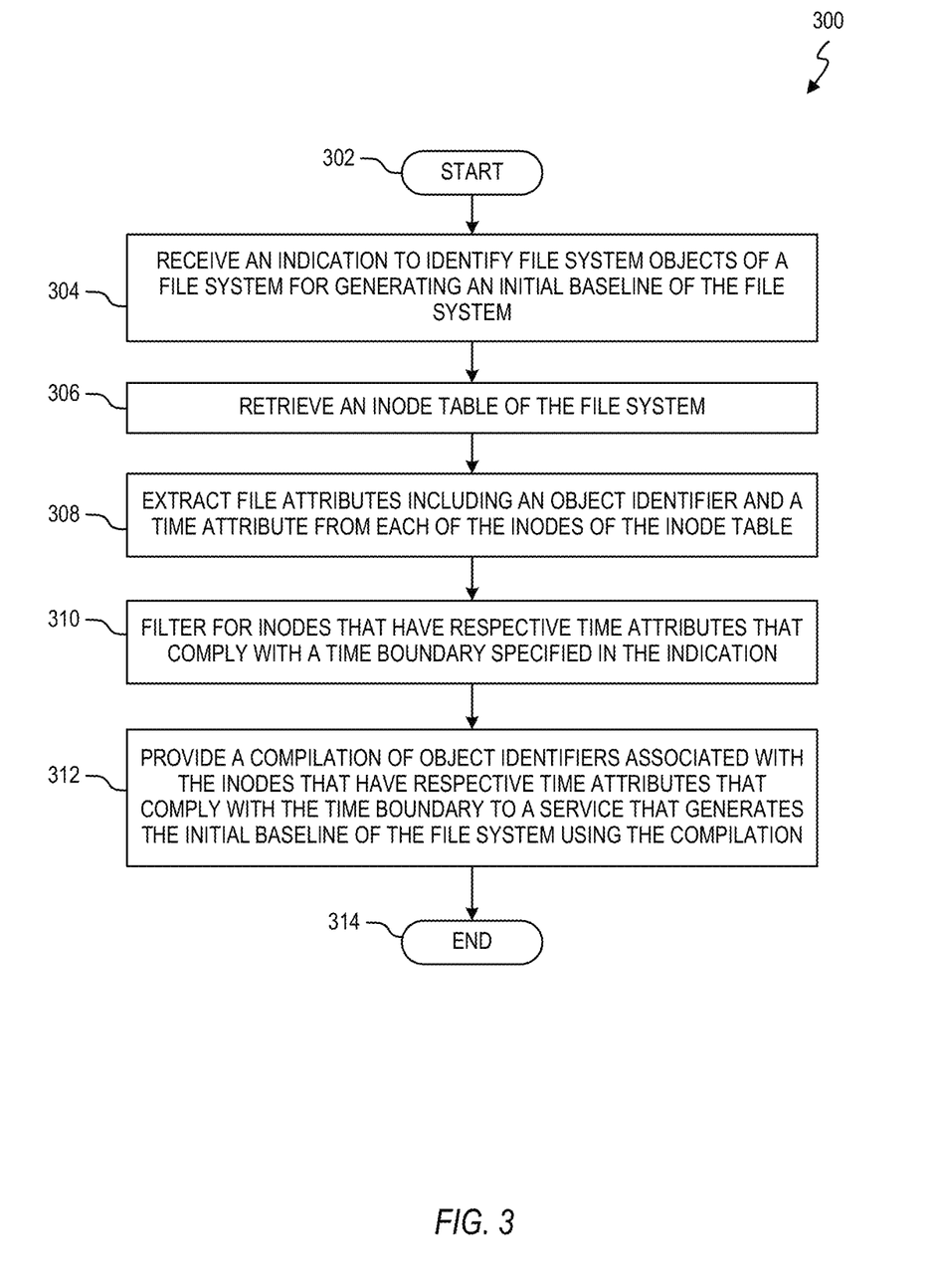
FIG. 3 is a flow diagram depicting an example method for identifying file system objects for generating an initial baseline of a file system.

FIG. 3 is a flow diagram depicting an example method 300 for identifying file system objects for generating an initial baseline of a file system. Method 300 may be implemented in the form of executable instructions stored on a non-transitory machine readable medium and executed by a processing resource (e.g., a microcontroller, a microprocessor, central processing unit core(s), an ASIC, an FPGA, etc.) and/or in the form of electronic circuitry. For example, method 300 may be performed by the system 100 described above, and more particularly, by an initial synchronization object identification service running on the system 100 by execution of the instructions 106, 108, 110, 112, 214 by the processing resource 102.

In some implementations, one or more blocks of method 300 may be executed substantially concurrently or in a different order than shown in FIG. 3. In some implementations, method 300 may include more or fewer blocks than are shown in FIG. 3. In some implementations, one or more of the blocks of method 300 may, at certain times, be ongoing and/or may repeat.

Method 300 may begin at block 302 and continue to block 304, where the initial synchronization object identification service receives an indication to identify file system objects of a file system for generating an initial baseline of the file system. The indication may be a trigger to perform method 300. The indication may include parameters such as a time boundary. The indication may be received from a service such as a replication service of a disaster recovery system, an archival service, a metadata scraping service, or any other data service. Block 304 may be performed by executing instructions 106 of the system 100.

At block 306, the initial synchronization object identification service retrieves an inode table of the file system. The inode table includes inodes corresponding respectively to file system objects of the file system. Block 306 may be performed by executing instructions 108 of the system 100.

At block 308, the initial synchronization object identification service extracts attributes, including an object identifier and a time attribute (e.g., creation time or modified time), from each of the inodes of the inode table retrieved at block 306. The object identifier of an inode uniquely identifies a corresponding object associated with the inode across the entire file system. Block 308 may be performed by executing instructions 110 of the system 100.

At block 310, the initial synchronization object identification service filters for inodes that have respective time attributes that comply with a time boundary specified in the indication (e.g., inodes with time attributes after the time boundary may be omitted). Block 310 may be performed by executing instructions 214 of the system 100 in the example of FIG. 2.

At block 312, the initial synchronization object identification service, provides a compilation of object identifiers associated with the inodes that have respective time attributes that comply with the time boundary (e.g., after filtering at block 310) to a service that generates the initial baseline of the file system using the compilation. Block 312 may be performed by executing instructions 112 of the system 100. The method 300 ends at block 314.

Figure 4:
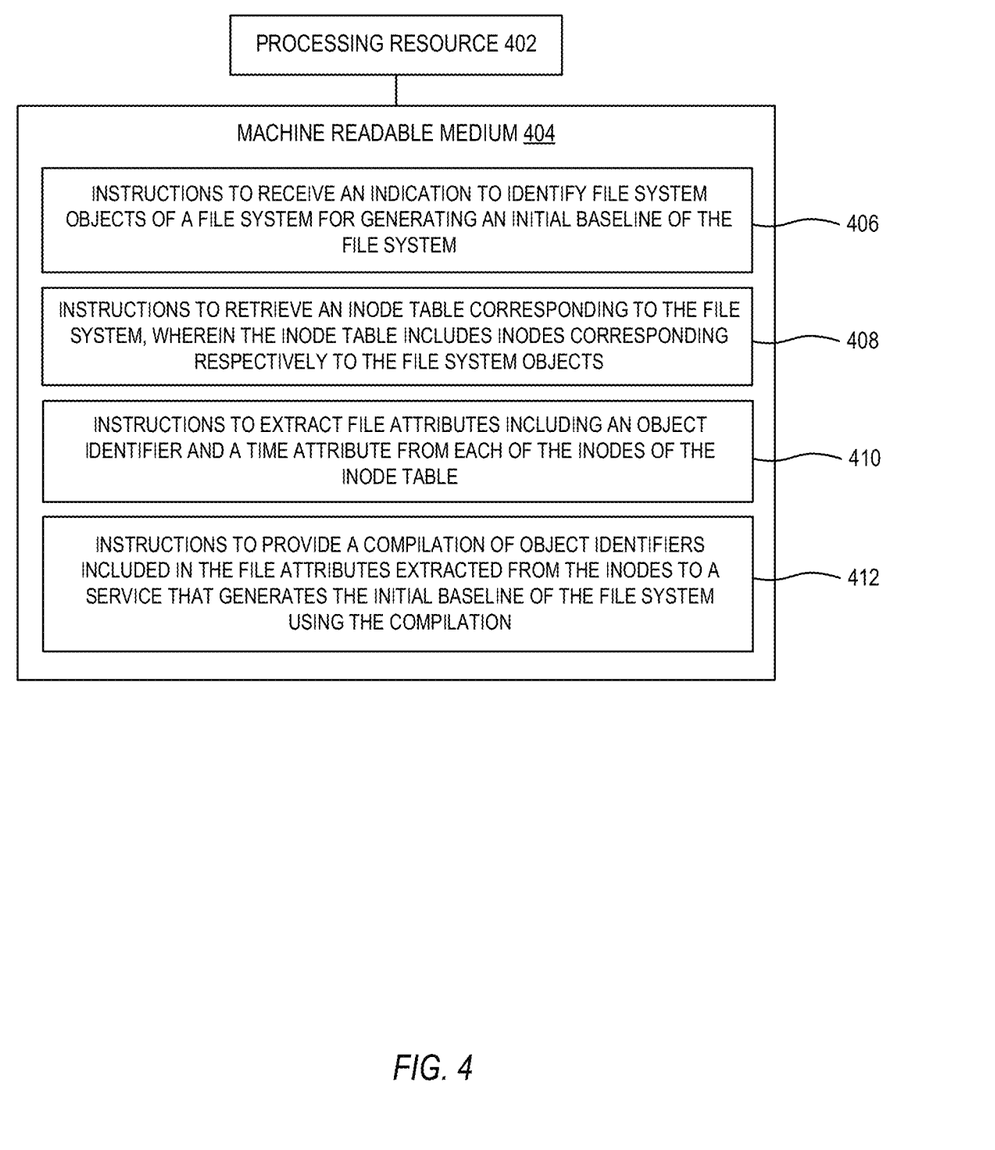
FIG. 4 is a diagram of an example non-transitory machine readable medium encoded with instructions for identifying file system objects for generating an initial baseline of a file system.

FIG. 4 is a block diagram of an example that includes a processing resource 402 coupled to a non-transitory machine readable medium 404 encoded with example instructions. The processing resource 402 may include a microcontroller, a microprocessor, central processing unit core(s), an ASIC, an FPGA, and/or other hardware device suitable for retrieval and/or execution of instructions from the machine readable medium 404 to perform functions related to various examples. Additionally or alternatively, the processing resource 402 may include electronic circuitry for performing the functionality of the instructions described herein. The processing resource 402 may serve as or be analogous to the processing resource 102 of the system 100, and the non-transitory machine readable medium 404 may serve as or be analogous to the medium 104 of the system 100.

The non-transitory machine readable medium 404 may be any medium suitable for storing executable instructions, such as RAM, ROM, EEPROM, flash memory, a hard disk drive, an optical disc, or the like. The machine readable medium 404 may be disposed within a system (such as a server), in which case the executable instructions may be deemed "installed" or "embedded" on the system. Alternatively, the machine readable medium 404 may be a portable (e.g., external) storage medium, and may be part of an "installation package."

As described further herein below, the machine readable medium 404 may be encoded with a set of executable instructions 406, 408, 410, 412. It should be understood that part or all of the executable instructions and/or electronic circuits included within one box may, in alternate implementations, be included in a different box shown in the figures or in a different box not shown. The instructions 406, 408, 410, 412 may be useful for implementing aspects of an initial synchronization object identification service or for performing aspects of method 300 to identify file system objects for generating an initial baseline of a file system.

Instructions 406, upon execution, cause the processing resource 402 to receive an indication to identify file system objects of a file system. The identified file system objects are useful for generating an initial baseline of the file system.

Instructions 408, upon execution, cause the processing resource 402 to respond to the indication by retrieving an inode table of the file system. The inode table includes inodes corresponding respectively to the file system objects. The inode table is a flat data structure (i.e., non-hierarchical).

Instructions 410, upon execution, cause the processing resource 402 to extract attributes, including an object identifier and a time attribute (e.g., creation time or modified time), from each of the inodes of the inode table retrieved by instructions 408. Instructions 410 may also compile the object identifiers from all of the extracted attributes into a list or other data structure.

Instructions 412, upon execution, cause the processing resource 402 to provide a compilation of object identifiers included in the attributes extracted by instructions 410 from the inodes to a service that generates an initial baseline of the file system using the compilation. As discussed above, the service may be a replication service of a disaster recovery system, an archival service, a metadata scraping service, a content indexing service, or the like.

Figure 5:
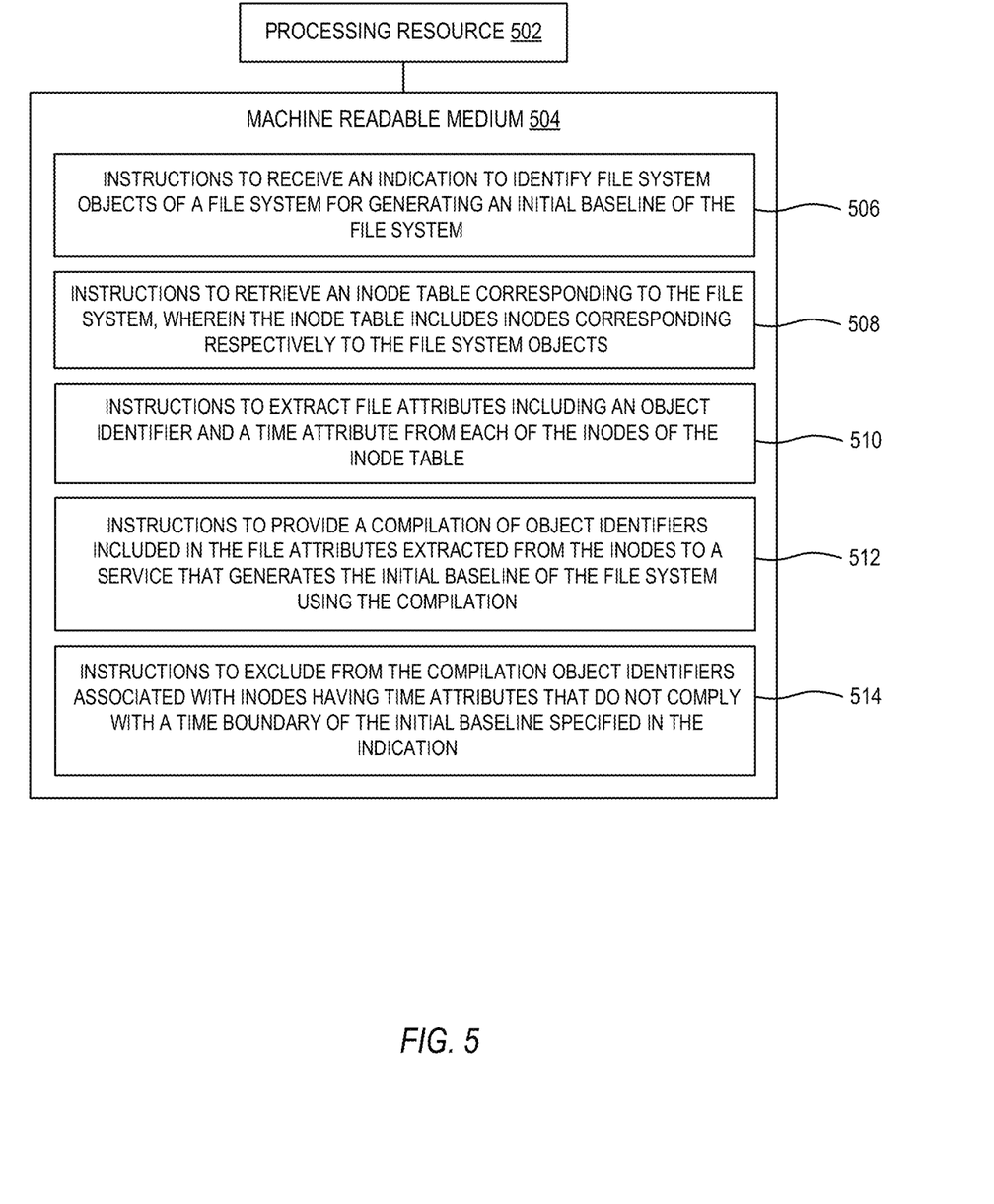
FIG. 5 is a diagram of another example non-transitory machine readable medium encoded with instructions for identifying file system objects for generating an initial baseline of a file system.

FIG. 5 is a block diagram depicting a processing resource 502 coupled to a non-transitory machine readable medium 504 encoded with example instructions. The processing resource 502 and the machine readable medium 504 may be analogous in many respects to the processing resource 402 and the machine readable medium 404, respectively.

The machine readable medium 504 may be encoded with a set of executable instructions 506, 508, 510, 512, 514. It should be understood that part or all of the executable instructions and/or electronic circuits included within one box may, in alternate implementations, be included in a different box shown in the figures or in a different box not shown. Some implementations of may include more or fewer instructions than are shown in FIG. 5.

Instructions 506, 508, 510, 512 may be analogous in many respects to instructions 406, 408, 410, 412, respectively. Instructions 508 are to receive an indication to identify file system objects, and the indication may include a time boundary. Instructions 508 are to retrieve an inode table, and instructions 510 are to extract file attributes from each of the inodes in the inode table, including an object identifier and time attribute(s).

Instructions 514, when executed, cause the processing resource 502 to exclude or remove from compilation any object identifiers that are associated with inodes that have time attributes that do not comply with the time boundary. Instructions 512 provide the compilation of object identifiers (sans object identifiers of nodes outside the time boundary) to a service that generates an initial baseline based on the compilation. In this manner, the compilation of object identifiers and the initial baseline reflect the state of the file system at the time boundary.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A non-transitory machine readable medium storing instructions executable by a processing resource, the non-transitory machine readable medium comprising:
   instructions to receive an indication to identify file system objects of a file system for generating an initial baseline of the file system, the file system comprising a first set of inodes, wherein each inode of the first set of inodes comprises attributes of a different file system object of the file system;
   instructions to, responsive to the indication, retrieve a flat inode table of the file system, wherein the flat inode table is a flat data structure comprising a second set of inodes that is different from the first set of inodes, and wherein each inode in the flat inode table is identical to a different inode of the first set of inodes in the file system;
   instructions to traverse the flat inode table and extract the attributes from each inode in the flat inode table, the extracted attributes including an object identifier and a time attribute from each inode of the inodes of the flat inode table;
   instructions to provide a compilation of object identifiers included in the attributes extracted from said each inode of the inodes to a service that generates the initial baseline of the file system using the compilation; and
   instructions to exclude, from the compilation, object identifiers associated with inodes having time attributes that do not comply with a time boundary of the initial baseline specified in the indication.

2. The non-transitory machine readable medium of claim 1, wherein the service is to generate the initial baseline of the file system using the compilation instead of using a list of object identifiers produced by walking a namespace of the file system.

3. The non-transitory machine readable medium of claim 1, wherein the service to which the compilation is provided is a replication service of a disaster recovery system, and the initial baseline generated by the replication service is a baseline replication of the file system objects corresponding to the object identifiers of the compilation.

4. The non-transitory machine readable medium of claim 1, wherein the service to which the compilation is provided is an archival service, and the initial baseline generated by the archival service is an initial checksum baseline of the file system objects corresponding to the object identifiers of the compilation.

5. The non-transitory machine readable medium of claim 1, wherein the service to which the compilation is provided is metadata scraping service.

6. A system comprising:
a processing resource; and a non-transitory machine readable medium storing instructions executable by the processing resource to:
receive an indication to identify file system objects of a file system for generating an initial baseline of the file system, the file system comprising a first set of inodes, wherein each inode of the first set of inodes comprises attributes of a different file system object of the file system,
responsive to the indication, retrieve a flat inode table of the file system, wherein the flat inode table is a flat data structure comprising a second set of inodes that is different from the first set of inodes, and wherein each inode in the flat inode table is identical to a different inode of the first set of inodes in the file system;
traverse the flat inode table and extract the attributes from each inode in the flat inode table, the extracted attributes including an object identifier and a time attribute from each inode of the inodes of the flat inode table,
provide a compilation of object identifiers included in the attributes extracted from said each inode of the inodes to a service that generates the initial baseline of the file system using the compilation;
exclude, from the compilation, object identifiers associated with inodes having time attributes that do not comply with a time boundary of the initial baseline specified in the indication.

7. The system of claim 6, further comprising a physical storage medium on which the file system is stored.

8. The system of claim 6, wherein the non-transitory machine readable medium stores instructions corresponding to the service and executable by the processing resource to generate the initial baseline of the file system using the compilation instead of using a list of object identifiers produced by walking a namespace of the file system.

9. The system of claim 6, wherein the service to which the compilation is provided is a replication service of a disaster recovery system, and the initial baseline generated by the replication service is a baseline replication of the file system objects corresponding to the object identifiers of the compilation.

10. The system of claim 6, wherein the service to which the compilation is provided is an archival service, and the initial baseline generated by the archival service is an initial checksum baseline of the file system objects corresponding to the object identifiers of the compilation.

11. The system of claim 6, wherein the service to which the compilation is provided is metadata scraping service, and the initial baseline generated by the metadata scraping service is a metadata index of the file system objects corresponding to the object identifiers of the compilation.

* * * * *